(No Model.)
J. H. STANFORD.
COTTON CHOPPER.
No. 424,906. Patented Apr. 1, 1890.
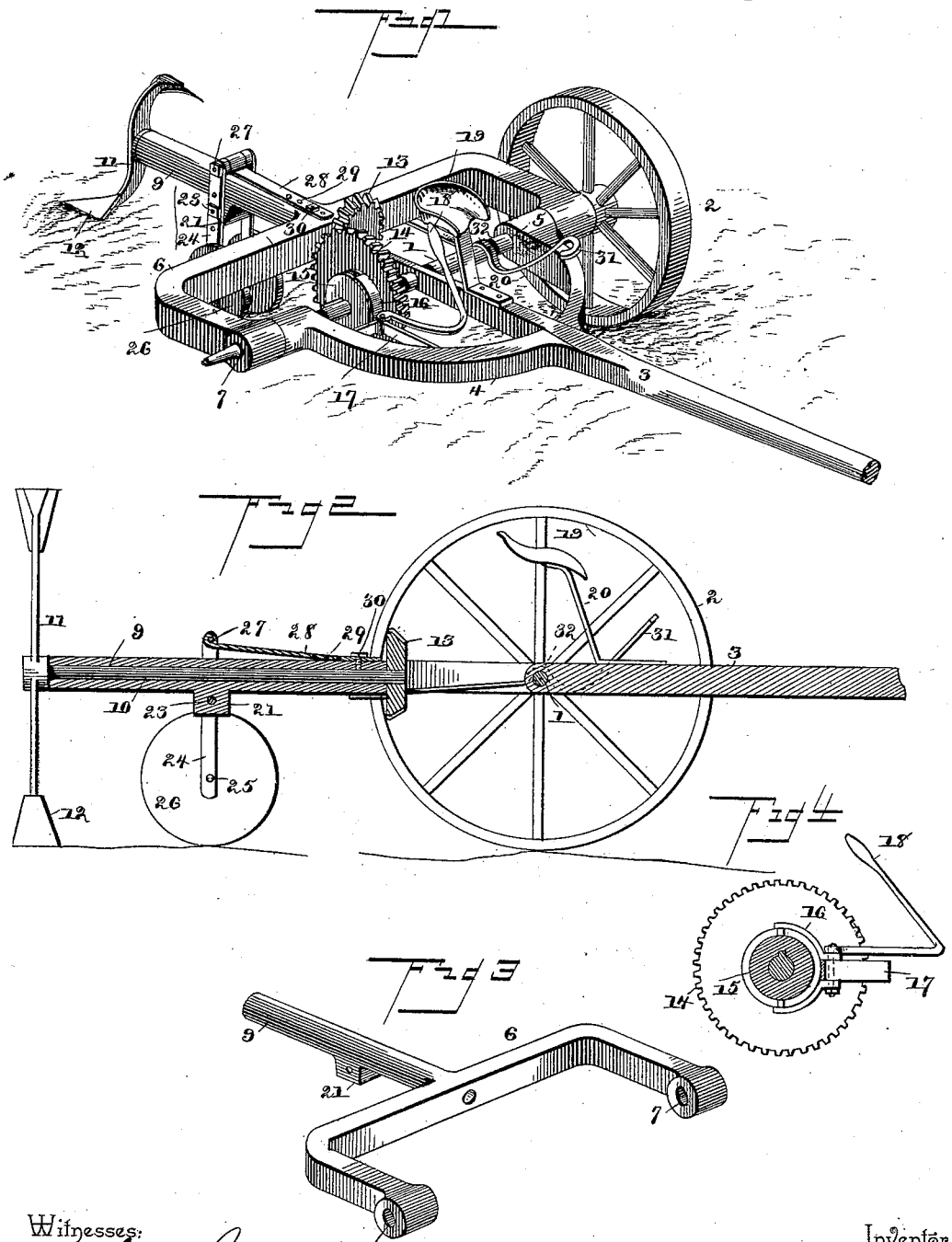
Witnesses:
John Imurie
W. S. Duvall
Inventor
Jeff H. Stanford
By his Attorneys,
C. A. Snow & Co.

UNITED STATES PATENT OFFICE.

JEFF HILLON STANFORD, OF BRAZOS POINT, TEXAS.

COTTON-CHOPPER.

SPECIFICATION forming part of Letters Patent No. 424,906, dated April 1, 1890.

Application filed September 17, 1889. Serial No. 324,193. (No model.)

*To all whom it may concern:*

Be it known that I, JEFF HILLON STANFORD, a citizen of the United States, residing at Brazos Point, in the county of Bosque and State of Texas, have invented a new and useful Cotton-Chopper, of which the following is a specification.

This invention has relation to cotton-choppers; and among the objects in view are to provide a cheaply-constructed, durable, and efficient chopper so constructed as to be capable of being readily thrown into and out of operative connection, and so that the cutting mechanism may be elevated, so as to pass over stumps, bowlders, and other obstructions, and which may be adjusted so as to cut the stalk at the desired height.

With these general objects in view the invention consists in certain features of construction hereinafter specified, and particularly pointed out in the claims.

Referring to the drawings, Figure 1 is a perspective of a cotton-chopper constructed in accordance with my invention. Fig. 2 is a longitudinal section; Fig. 3, a perspective of the cutter-supporting adjusting-truck. Fig. 4 is a detail view of the clutch.

Like numerals of reference indicate like parts in all the figures of the drawings.

1 represents the axle, rigid with which are the opposite ground-wheels 2, and to the center of the axle is loosely connected the rear end of the draft-bar or tongue 3. At each side of the tongue are bolted the forward ends of quadrantal-shaped hounds 4, the rear ends of the hounds being provided with bearings 5 for the reception of the axle.

6 represents a U-shaped frame, the terminals of the U being provided with bearings 7 for the reception of the axle 1, and mounted on said axle, between the ground-wheels and the rear ends of the quadrantal hounds 4, a centrally-bored sleeve 9 projects rearwardly from the center of the U-shaped frame, and journaled in the sleeve is a revoluble shaft 10, carrying at its rear end, which projects beyond the rear end of the sleeve, revoluble cutter-arms 11, carrying chopper-blades 12. The forward end of the shaft also projects in front of the sleeve and is provided with a small pinion 13.

14 represents a master-gear provided with a hub 15, having an annular groove, the hub and gear being mounted upon the axle 1 and splined to said axle, so that the gear may be thrown into and out of mesh with the small pinion 13. For the purpose of thus operating the master-gear a yoke 16 embraces the hub and is pivoted in a bracket 17, extending from one of the hounds, said yoke being operated by a hand-lever 18, projecting up within easy grasp of the occupant of the seat 19, mounted on the standard 20 and secured to the draft-bar. By this it will be apparent that the chopping mechanism may be thrown into and out of operation at the will of the operator.

A block 21 projects from the lower surface of the sleeve and is provided with a perforation extending transversely therethrough, and adjustably connected to the sides of the block by means of a set-bolt 23 is a pair of vertical truck-standards 24, having a series of perforations, either of which is adapted to be connected with the bearing-block. From the lower ends of the standards project lateral bearings 25, and upon the same are mounted small truck-wheels 26, which support the choppers at any desired height from the ground. A tie-bolt 27 connects the upper ends of the standards, and from the same there projects forwardly an adjusting-strap 28, having a series of perforations 29, any one of which is designed by a set-bolt 30 for connection with the center of the U-frame, and in this manner the truck is adjusted to or from the chopper and may be adjusted to or from the ground by the driver.

31 represents a foot-lever, the rear end of which is connected to the U-frame near its center and is offset, as at 32, to pass over the axle 1. By a depression of the lever the offset portion is brought into contact with the axle 1, which then serves the function of a fulcrum, and it will be apparent that the U-frame, the truck, and the choppers may be entirely raised from the ground to pass over any obstructions it may be desirable to avoid and that without deviating from the line of travel.

The chopping-blade is preferably made removable, so that cutters of different capacities may be substituted.

Having described my invention, what I claim is—

1. In a cotton-chopper, the combination, with the axle, of the U-frame having bearings at its ends for the axle and a rearwardly-disposed sleeve, a shaft mounted in the sleeve and projecting beyond the same at each of its ends and provided with choppers at its rear end and a gear at its front end, a master-gear splined upon the axle and having a grooved hub, and a pivoted yoke terminating in the hub and a lever for operating the same to throw the gear into contact with that upon the shaft, substantially as specified.

2. In a cotton-chopper, the combination, with the U-frame pivotally connected to the axle, the sleeve extending from the frame, the shaft mounted in the sleeve and carrying choppers, and the perforated bearing-block depending from the sleeve, of the opposite truck-standards having a series of openings and the adjusting-bolt for connecting the same with the block, the bearings at the lower ends of the standards, the wheels mounted on the bearings, and the tie-bolt connecting the upper ends of the standards and the forwardly-projecting perforated connecting-strap and set-bolt, substantially as specified.

3. In a cotton-chopper, the combination, with the axle, of the U-frame having bearings at its ends for the axle and a rearwardly-disposed sleeve, a shaft mounted in the sleeve and projecting beyond the same at each of its ends and provided with choppers at its rear end and a gear at its front end, a master-gear splined upon the axle, and devices for throwing the master-gear into and out of mesh with the gear of the chopper-shaft, as set forth.

In testimony that I claim the foregoing as my own I have hereto affixed my signature in presence of two witnesses.

JEFF HILLON STANFORD.

Witnesses:
Z. E. MICKEY,
J. H. WILLMORE.